US010740089B1

(12) United States Patent
Singh et al.

(10) Patent No.: US 10,740,089 B1
(45) Date of Patent: Aug. 11, 2020

(54) SYSTEM AND METHOD FOR POWER SUPPLY UNIT FIRMWARE UPDATE

(71) Applicant: Dell Products L.P., Round Rock, TX (US)

(72) Inventors: Ravi Shekhar Singh, Bokaro (IN); Vaishnavi Suchindran, Bangalore (IN); Craig Anthony Klein, Elgin, TX (US); Venkata Nagesh Babu Doddapaneni, Hyderabad (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/351,112

(22) Filed: Mar. 12, 2019

(51) Int. Cl.
*G06F 8/65* (2018.01)
*G06F 1/26* (2006.01)

(52) U.S. Cl.
CPC . *G06F 8/65* (2013.01); *G06F 1/26* (2013.01)

(58) Field of Classification Search
CPC ............................. G06F 1/26; G06F 8/60–71
USPC .................................................. 717/168–178
See application file for complete search history.

(56) References Cited

U.S. PATENT DOCUMENTS

| 9,250,684 B1* | 2/2016 | Chen ..................... G06F 1/3206 |
| 2008/0086652 A1* | 4/2008 | Krieger ..................... G06F 1/26 |
| | | 713/330 |
| 2010/0037070 A1* | 2/2010 | Brumley ............... G06F 1/3209 |
| | | 713/300 |
| 2010/0332873 A1* | 12/2010 | Munjal ................. G06F 1/3203 |
| | | 713/320 |
| 2013/0138979 A1* | 5/2013 | Wang ................... H04L 12/6418 |
| | | 713/300 |
| 2013/0138980 A1* | 5/2013 | Wang ................... H04L 12/6418 |
| | | 713/300 |
| 2014/0196048 A1* | 7/2014 | Mathur .................... G06F 9/485 |
| | | 718/104 |
| 2014/0208131 A1* | 7/2014 | Kano .................... H01M 10/46 |
| | | 713/300 |

(Continued)

OTHER PUBLICATIONS

Pelley, S., et al., Power Routing: Dynamic Power Provisioning in the Data Center, Proceedings of the fifteenth International Conference on Architectural support for programming languages and operating systems, Mar. 2010, pp. 231-242, [retrieved on Mar. 28, 2020], Retrieved from the Internet.*

(Continued)

*Primary Examiner* — Geoffrey R St Leger
(74) *Attorney, Agent, or Firm* — Baker Botts L.L.P.

(57) ABSTRACT

Methods, systems, and computer programs encoded on computer storage medium, for determining that an update of the PSU firmware is received for a plurality of PSUs of a data center; determining that an update priority flag indicates unthrottled operation of the data center, and in response: determining that a number of PSUs of the data center is greater than a minimum number of PSUs for the unthrottled operation of the data center, and in response, applying the update to each of the PSUs; determining that the number of PSUs of the data center is less than the minimum number of PSUs for the unthrottled operation of the data center, and in response: adjusting a power capacity and maximum current state of the data center, and after adjusting the power capacity and the maximum current state of the data center, applying the update to each of the PSUs.

20 Claims, 6 Drawing Sheets

(56) References Cited

U.S. PATENT DOCUMENTS

| | | | |
|---|---|---|---|
| 2015/0121113 A1* | 4/2015 | Ramamurthy | H02J 9/061 |
| | | | 713/340 |
| 2015/0177814 A1* | 6/2015 | Bailey | G06F 1/3234 |
| | | | 713/320 |
| 2016/0011887 A1* | 1/2016 | Chung | G06F 9/4416 |
| | | | 713/2 |
| 2017/0010652 A1* | 1/2017 | Huang | G06F 11/0751 |
| 2017/0075676 A1* | 3/2017 | Li | G06F 8/71 |
| 2019/0050036 A1* | 2/2019 | Hall | G06F 1/26 |
| 2019/0317588 A1* | 10/2019 | Messick | G06F 1/30 |
| 2019/0354153 A1* | 11/2019 | Hauser | G06F 9/44 |

OTHER PUBLICATIONS

Li, Y., et al., A Scalable Priority-Aware Approach to Managing Data Center Server Power, IEEE International Symposium on High Performance Computer Architecture (HPCA), Feb. 16-20, 2019, pp. 701-714, [retrieved on Mar. 28, 2020], Retrieved from the Internet.*

* cited by examiner

SYSTEM AND METHOD FOR POWER SUPPLY UNIT FIRMWARE UPDATE

BACKGROUND

Field of the Disclosure

The disclosure relates generally to power supply unit firmware updates.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

To have uninterrupted working of a data center and servers, including information handling systems, timely firmware updates are necessary for its components. It is recommended that power supply units (PSUs) are updated with the latest firmware to avoid any unplanned power outage. Currently, PSU updates require servers to power down. For example, a 2-PSU system can take up to 10 minutes to power on the servers. With 1000s of servers in a data center, the cumulative downtime may be more than 160 hours. In a system, all PSUs are updated at once. In case of any failure, the system does not get sufficient power. Thus, the system can go down permanently until updated PSUs are available. It would be beneficial to update the PSU firmware without having to power down the system during the update process.

SUMMARY

Innovative aspects of the subject matter described in this specification may be embodied in a method of updating power supply unit (PSU) firmware, the method including determining that an update of the PSU firmware is received for a plurality of PSUs of a data center; determining that an update priority flag indicates unthrottled operation of the data center, and in response: determining that a number of PSUs of the data center is greater than a minimum number of PSUs for the unthrottled operation of the data center, and in response, applying the update to each of the PSUs of the data center; determining that the number of PSUs of the data center is less than the minimum number of PSUs for the unthrottled operation of the data center, and in response: adjusting a power capacity and maximum current state of the data center, and after adjusting the power capacity and the maximum current state of the data center, applying the update to each of the PSUs of the data center; determining that the update priority flag indicates redundancy of the data center, and in response: determining that a number of PSUs of the data center associated with a first electrical grid is greater than the minimum number of PSUs for the unthrottled operation of the data center, and in response, applying the update to each of the PSUs of the data center associated with the first electrical grid; determining that the number of PSUs of the data center associated with the first electrical grid is less than the minimum number of PSUs for the unthrottled operation of the data center, and in response: adjusting a power capacity and maximum current state of the data center, and after adjusting the power capacity maximum and the current state of the data center, applying the update to each of the PSUs associated with the first electrical grid of the data center.

Other embodiments of these aspects include corresponding system, apparatus, and computer programs, configured to perform the actions of the methods, encoded on computer storage devices.

These and other embodiments may each optionally include one or more of the following features. For instance, in response to determining that the update priority flag indicates redundancy of the data center: determining that a number of PSUs of the data center associated with a second electrical grid is greater than the minimum number of PSUs for the unthrottled operation of the data center, and in response, applying the update to each of the PSUs of the data center associated with the second electrical grid; determining that the number of PSUs of the data center associated with the second electrical grid is less than the minimum number of PSUs for the unthrottled operation of the data center, and in response: adjusting the power capacity and the maximum current state of the data center, and after adjusting the power capacity maximum and the current state of the data center, applying the update to each of the PSUs associated with the second electrical grid of the data center. After applying the update to each of the PSUs associated with the second electrical grid of the data center, identifying one or more remaining PSUs to apply the update to; and in response to identifying the remaining PSUs, creating a log event identifying the remaining PSUs. In response to determining that the update of the PSU firmware is received, determining that a live update indicator flag is set; and in response to determining that the live update indicator flag is set, determining a status of the update priority flag. In response to determining that the update of the PSU firmware is received, determining that a live update indicator flag is not set; and in response to determining that the live update indicator flag is not set, determining that the data center is in a sleeping state, and subsequently applying the update to each of the PSUs of the data center. After determining that the number of PSUs of the data center is less than the minimum number of PSUs for the unthrottled operation of the data center, determining that a capacity of the number of PSUs of the data center minus 1 is less than a lower bound threshold; and in response to determining that the capacity of the number of PSUs of the data center minus 1 is less than the lower bound threshold, creating a log event. After applying the update to each of the PSUs of the data center, restoring the previous power capacity and maximum current state of the data center. After applying the update to each of the PSUs associated with the first power grid of the data center, restoring the previous power capacity and maximum current state of the data center.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This document discusses a method of using a system power budget and power capping to minimize the system shutdown when updating PSU firmware. Specifically, using existing power budgeting calculations, a remote access controller can determine whether PSU firmware can be updated, and what power control mechanism are required to manage the system power during the firmware updated process. A user can be provided an option to prioritize system power redundancy or system performance.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-5 wherein like numbers are used to indicate like and corresponding parts.

Figure 1:
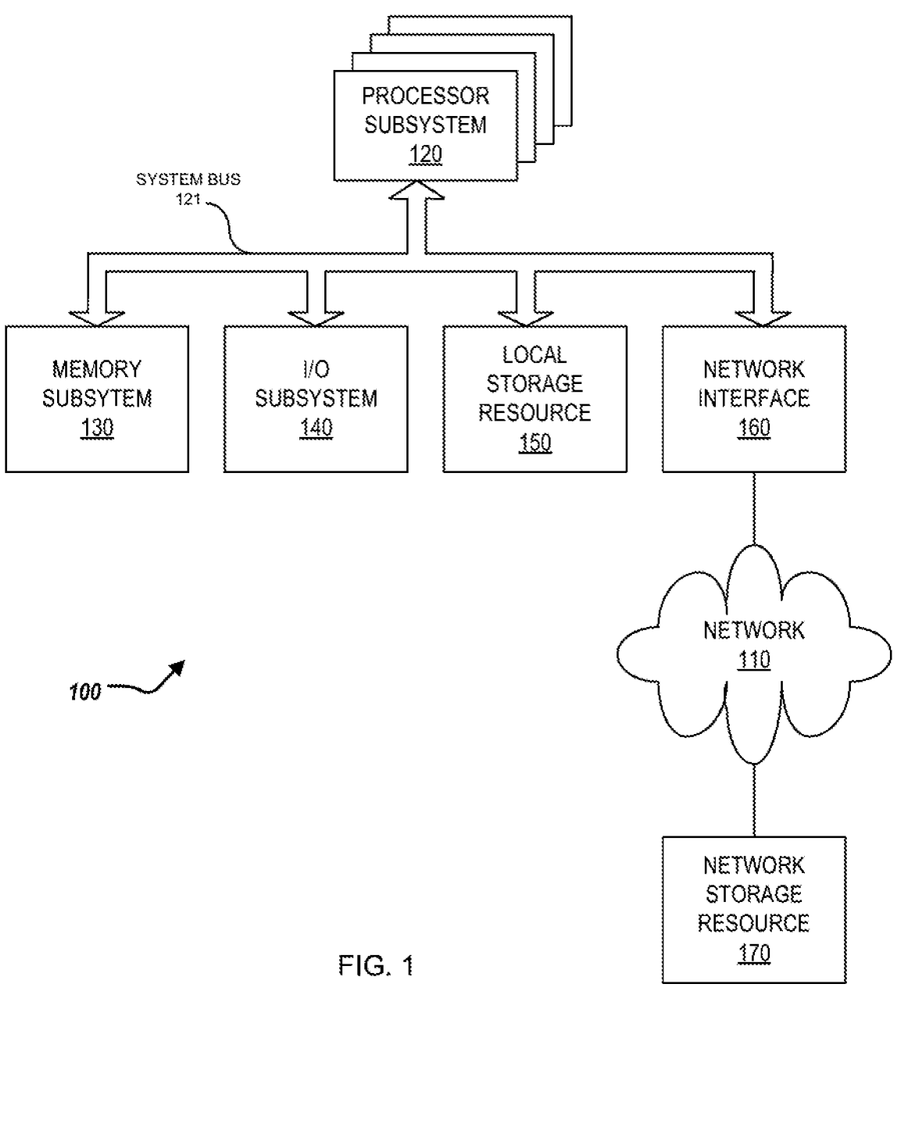
FIG. 1 is a block diagram of selected elements of an embodiment of an information handling system.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2:
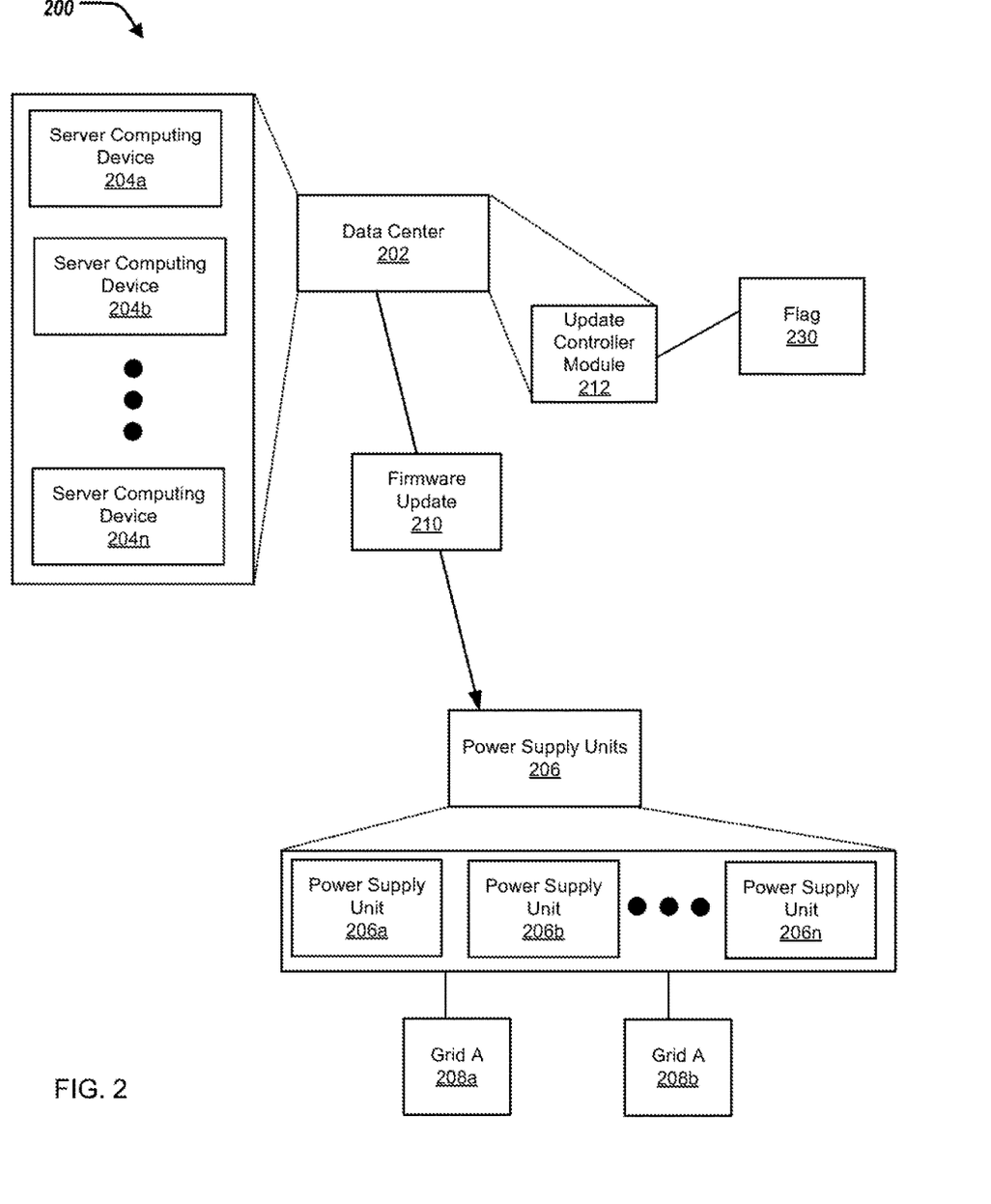
FIG. 2 illustrates a computing environment for updating PSU firmware.

Turning now to FIG. 2, FIG. 2 depicts a computing environment 200 for updating PSU firmware. The environment 200 can include a data center 202 that includes a server computing devices 204a, 204b, . . . 204n (collectively referred to as server computing devices 204). Each of the server computing devices 204 can include the information handling system 100 of FIG. 1. The data center 202 can include an update controller module (or server) 212 (remote access controller). The environment 200 can further include power supply units (PSUs) 206a, 206b, . . . , 206n (collectively referred to as PSUs 206 and illustrated accordingly). In some examples, the data center 202 includes the PSUs 206. The PSUs 206 can be in communication with, or a part of, a grid 208a and/or a grid 208b (collectively referred to as grids 208). Each of the grids 208 can include, or be associated with, a subset of the PSUs 206. In some examples, each of the grids 208 can include non-overlapping subsets of the PSUs 206. In some examples, the grids 208 can include overlapping subsets of the PSUs 206. In short, the environment 200, and the specifically, the update controller module 220, can facilitate efficiently and appropriately using a power budget of the data center 202 and/or the PSUs 206 to minimize shutdown of the server computing devices 204 when implementing PSU firmware update 210 of the PSUs 206.

In some examples, the data center 202 and the server computing devices 204 can have a redundancy policy enabled for the appropriate PSUs 206. For example, a first redundancy policy can include a M+N configuration when M=N. Specifically, the first redundancy policy is a grid-redundant policy. Configurations can include 1+1 and 2+2 redundancy. The power load can be shared across all PSUs 206 and both grids (e.g., grids 208). The data center 202 can continue to function on the loss of a single grid 208. A second redundancy policy can include a M+N configuration where M>N. Specifically, the second redundancy policy is a PSU-redundant configuration. Configurations can include 3+1. The data center 202 can continue to function after the loss of a PSU 206. A third redundancy policy can include M+N configuration when N=0. Specifically, the third redundancy policy is a non-redundant configuration. The data center 202 can be at a risk of shutdown on the loss of a single PSU 206. Power allocation of the data center 202 and the PSUs 206 can be determined using one of these configurations.

To that end, the computing environment 200 can manage the PSU firmware update 210 while maximizing the availability of the data center 202, and the server computing devices 204. The update controller module 212 can analyze the power budget of the data center 202 before every attempted application of the PSU firmware update 210. Analyzing the power budget of the data center 202 can include i) determining a minimum number of PSUs 206 required to support the data center 202 at a full performance and ii) determining a minimum number of PSUs 206 required to support the data center 202 at throttled performance. Furthermore, to maximize the output of the data center 202, the update controller module 212 can identify states (in order of priority) for the data center 202 and the PSUs 206: i) the data center 202 receives unthrottled operation (e.g., full performance) with PSUs 206 in redundant mode; ii) the data center 202 receives unthrottled operation (e.g., full performance) with PSUs 206 having redundancy (e.g., full performance) with PSUs 206 having redundancy lost; iii) the data center 202 is throttled (e.g., via a power cap or max current limit) to maintain PSU 206 redundancy; iv) the data center 202 is throttled (e.g., via a power cap or max current limit) but redundancy of PSUs 206 is lost; v) data center 206 has a spare slot to support the power budget, and vi) the data center 202 is updated in the previous state (state 5).

In short, as explained in further detail with respect to FIG. 3, the update controller module 212 determines whether live updates of the PSUs 206 are enabled or disabled (e.g., via user input). When the live updates are disabled, the update controller module 212 performs firmware updates 210 of the PSU 206 firmware at state 5. When the live updates are enabled, the update controller module 212 determines a status of a priority indicator flag 230 (e.g., as set by a user). The priority indicator flag 230 can indicate i) unthrottled operation of the data center 202 or ii) redundancy of the PSUs 206 of the data center 202. For example, the update controller module 212 can perform the PSU firmware update 210 without the loss of redundancy; throttling of the data center 202 can be used to maintain the redundancy if the power budget allows. Further, the update controller module 212 can perform the PSU firmware update 210 without throttling of the data center 206; a temporary loss of redundancy of the PSUs 206 is preferred over throttling of the data center 202. Moreover, if the update controller module 212 cannot perform the PSU firmware update 210 without throttling or redundancy loss, the PSUs 206 are updated at the next opportunity of stage 5 (and the user can be notified). To that end, based on the status of the priority indicator flag 230, the update controller module 212 updates the PSUs 206 accordingly.

Figure 3A:
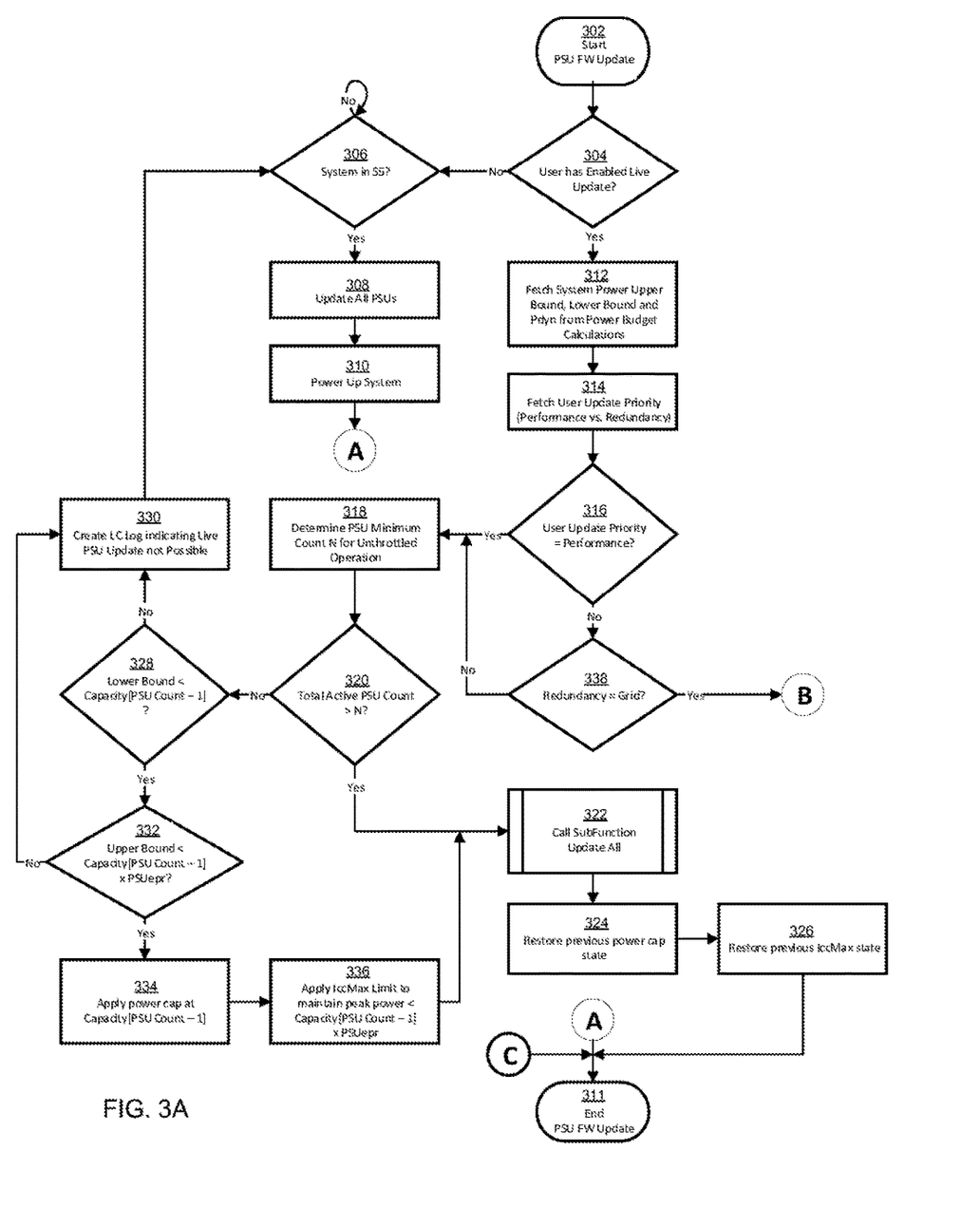
FIGS. 3A, 3B, 4, 5 illustrates respective flowcharts for updating PSU firmware.
Figure 3B:
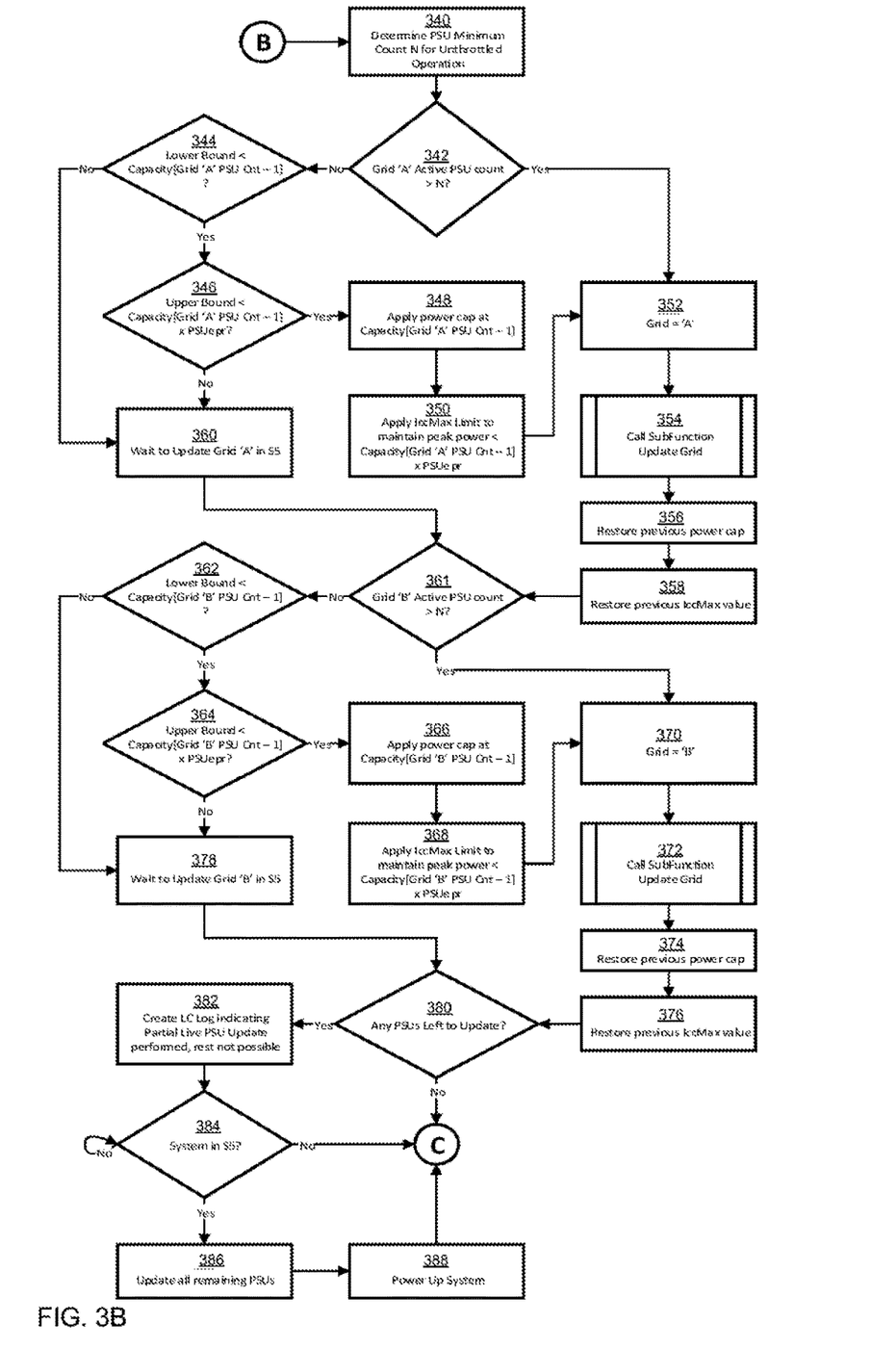

FIGS. 3A, 3B illustrates a flowchart depicting selected elements of an embodiment of a method 300 for updating PSU firmware. The method 300 may be performed by the information handling system 100, the computing environment 200, and/or the update controller module 212 described herein with reference to FIGS. 1 and 2, or another information handling system. It is noted that certain operations described in method 300 may be optional or may be rearranged in different embodiments.

At 302, the PSU 206 firmware update is initiated. In other words, the update controller module 212 determines that the PSU firmware update 210 is received for the PSUs 206 of the data center 202. At 304, it is determined if live updates are enabled (e.g., by a user). In other words, in response to determining that the PSU firmware update 210 is received, it is determined that a live update indicator flag is not set. At 306, in response to determining that live updates are not enabled, it is determined whether the data center 202, or the server computing devices 204, are in the stage 5 state. When the data center 202, or the server computing devices 204 are not in the stage 5 state, it is re-determined whether the same are in the stage 5 state until the same are in the stage 5 state. When the data center 202, or the server computing devices 204, are in the stage 5 state, at 308, all PSUs are updated. In other words, in response to determining that the live update indicator flag is not set (e.g., at 304), it is determined that the data center 202 is in stage 5 (e.g., a sleeping state), and subsequently applies the PSU firmware update 210 to each of the PSUs 206 of the data center 202. At 310, the data center 202 is powered up, and at 311, the firmware update of the PSUs 206 is ended.

At 312, in response to determining that the live update indicator flag is set (at 304), a power upper bound, power low bound, and dynamic power ($P_{dyn}$) are identified from the power budget calculations. At 314, the update priority is identified (performance v. redundancy). In other words, a status of the update priority flag is determined. At 316, it is determined whether the user update priority is unthrottled operation of the data center (performance). In other words, in response to determining that the live update indicator flag is set (at 304), a status of the update priority flag is determined, and specifically, it is determined whether the update priority flag indicates unthrottled operation of the data center 202. At 318, after determining that the update priority flag indicates unthrottled operation of the data center 202, the PSU 206 minimum count for unthrottled operation of the data center 202 is determined. At 320, it is determined if the total number of active PSUs 206 is greater than the minimum count of PSUs 206 for unthrottled operation of the data center 202. In other words, it is determined whether a number of active PSUs 206 of the data center 202 is greater than a minimum number of PSUs 206 for unthrottled operation of the data center 202. At 322, if it is determined that the number of active PSUs 206 is greater than the minimum number of PSUs 206 for unthrottled operation of the data center 202, the sub-function update all is called. That is, the PSU firmware update 210 is applied to each of the PSUs 206 of the data center 202. At 324, the previous power cap state is restored, and at 326, the previous max current limit (IccMax) is restored. At 311, the firmware update of the PSUs 206 is ended.

At 328, if it is determined that the number of active PSUs 206 is not greater (or less than) than the minimum number of PSUs 206 for unthrottled operation of the data center 202, it is determined whether a capacity of the PSUs 206 minus 1 is greater than a lower bound. At 330, in response to determining that the capacity of the PSUs 206 minus 1 is less than the lower bound threshold, a log event is created indicating that live PSU 206 is not possible. The method 300 then proceed back to step 306. At 332, in response to determining that the capacity of the PSUs 206 minus 1 is greater than the lower bound threshold, it is determined if the product of the extended power range of the PSUs 206 (PSUepr) and capacity of the PSUs 206 minus 1 is greater than an upper bound threshold. If it is determined that such a product is less than the upper bound threshold, then the method 300 proceeds to step 330. If it is determined that such a product is greater than the lower bound threshold, then the method 300 proceed to step 334. At step 334, a power cap is applied at capacity of the PSUs 206 minus 1 (e.g., the power of the PSUs 206 is within one PSU). In some examples, in response to determining that the number of PSUs 206 of the data center 202 is less than the minimum number of PSUs 206 for the unthrottled operation of the data center 202 (at 320), ultimately, a power capacity of the data center 202 and the PSUs 206 is adjusted. At step 336, a maximum current limit is applied to the data center and the PSUs 206 to maintain peak power less than the product of the extended power range of the PSUs 206 (PSUepr) and capacity of the PSUs 206 minus 1 is greater than an upper bound threshold. In some examples, in response to determining that the number of PSUs 206 of the data center 202 is less than the minimum number of PSUs 206 for the unthrottled operation of the data center 202 (at 320), ultimately, the maximum current state of the data center 202 is adjusted. The method then proceeds to step 322, and specifically, the sub-function update all is called. That is, the PSU firmware update 210 is applied to each of the PSUs 206 of the data center 202. In some examples, after adjusting the power capacity (at 334) and adjusting the maximum current state of the data center (at 336), the PSU firmware update 210 is applied to the PSUs 206 of the data center 202. The method 300 proceeds to step 324, where the previous power cap state is restored. In other words, after applying the PSU firmware update 210 to the PSUs 206, the previous power capacity of the data center 202 is restored. At step 326, the previous maximum current state is restored. In other words, after applying the PSU firmware update 210 to the PSUs 206, the previous maximum current state of the data center 202 is restored. The method 300 then proceeds to step 311, the firmware update of the PSUs 206 is ended.

At 316, if it is determined that the update priority flag does not indicate unthrottled operation of the data center 202, the method 300 proceeds to step 338. At step 338, it is determined if update priority flag indicates redundancy of the data center 202. If it is determined that the update priority flag does not indicate redundancy of the data center 202, the method 300 proceeds to step 318. If is determined that the update priority flag does indicate redundancy of the data center 202, at 340, the PSU 206 minimum count for unthrottled operation of the data center 202 is determined. At 342, it is determined if the total number of active PSUs 206 associated with grid 208a is greater than the minimum count of PSUs 206 for unthrottled operation of the data center 202. In other words, it is determined whether a number of active PSUs 206 associated with grid 208a of the data center 202 is greater than a minimum number of PSUs 206 for unthrottled operation of the data center 202. At 344, if it is determined that the number of active PSUs 206 associated with grid 208a is not greater (or less than) than the minimum number of PSUs 206 for unthrottled operation of the data center 202, it is determined whether a capacity of the PSUs 206 associated with grid 208a minus 1 is greater than a lower bound. At 346, in response to determining that the capacity of the PSUs 206 associated with the grid 208a minus 1 is greater than the lower bound threshold, it is determined if the product of the extended power range of the PSUs 206 (PSUepr) and capacity of the PSUs 206 associated with the grid 208a minus 1 is greater than an upper bound threshold.

If it is determined that such a product is greater than the lower bound threshold, then the method 300 proceed to step 348. At step 348, a power cap is applied at capacity of the PSUs 206 associated with grid 208a minus 1 (e.g., the power of the PSUs 206 associated with the grid 208a is within one PSU). In some examples, in response to determining that the number of PSUs 206 associated with the grid 208a is greater than the minimum number of PSUs 206 for the unthrottled operation of the data center 202 (at 342), ultimately, a power capacity of the data center 202 and the PSUs 206 associated with the grid 208a is adjusted. At step 350, a maximum current limit (IccMax) is applied to the data center and the PSUs 206 to maintain peak power less than the product of the extended power range of the PSUs 206 (PSUepr) and capacity of the PSUs 206 associated with the grid 208a minus 1 is greater than an upper bound threshold. In some examples, in response to determining that the number of PSUs 206 associated with the grid 208a is greater than the minimum number of PSUs 206 for the unthrottled operation of the data center 202 (at 342), ultimately, the maximum current state of the data center 202 is adjusted. The method 300 proceeds to step 352 to identify the grid 208a, and then at step 354, the sub-function update grid is called. That is, the PSU firmware update 210 is applied to each of the PSUs 206 associated with the grid 208a. In some examples, after adjusting the power capacity (at 348) and adjusting the maximum current state of the data center (at 350), the PSU firmware update 210 is applied to the PSUs 206 associated with the grid 208a. The method 300 proceeds to step 356, where the previous power cap state is restored. In other words, after applying the PSU firmware update 210 to the PSUs 206 associated with the grid 208a, the previous power capacity of the data center 202 is restored. At step 358, the previous maximum current state is restored. In other words, after applying the PSU firmware update 210 to the PSUs 206 associated with the grid 208a, the previous maximum current state of the data center 202 is restored.

In some examples, in response to determining that the capacity of the PSUs 206 associated with the grid 208a minus 1 is not greater than the lower bound threshold (at 344), at 360, the PSUs 206 are updated when the data center 202 is in state 5. In some examples, in response to determining that the product of the extended power range of the PSUs 206 (PSUepr) and capacity of the PSUs 206 associated with the grid 208a minus 1 is not greater than an upper bound threshold (at 346), at 360, the PSUs 206 are updated when the data center 202 is in state 5. In some examples, if it is determined that the number of active PSUs 206 associated with grid 208a is greater than the minimum number of PSUs 206 for unthrottled operation of the data center 202, the method 300 proceeds to step 352 to identify the grid 208a.

In some examples, at 361, it is determined if the total number of active PSUs 206 associated with grid 208b is greater than the minimum count N of PSUs 206 for unthrottled operation of the data center 202. In other words, it is determined whether a number of active PSUs 206 associated with grid 208b of the data center 202 is greater than a minimum number of PSUs 206 for unthrottled operation of the data center 202. At 362, if it is determined that the number of active PSUs 206 associated with grid 208b is not greater (or less than) than the minimum number of PSUs 206 for unthrottled operation of the data center 202, it is determined whether a capacity of the PSUs 206 associated with grid 208b minus 1 is greater than a lower bound. At 364, in response to determining that the capacity of the PSUs 206 associated with the grid 208b minus 1 is greater than the lower bound threshold, it is determined if the product of the extended power range of the PSUs 206 (PSUepr) and capacity of the PSUs 206 associated with the grid 208b minus 1 is greater than an upper bound threshold.

If it is determined that such a product is greater than the lower bound threshold, then the method 300 proceed to step 366. At step 366, a power cap is applied at capacity of the PSUs 206 associated with grid 208b minus 1 (e.g., the power of the PSUs 206 associated with the grid 208b is within one PSU). In some examples, in response to determining that the number of PSUs 206 associated with the grid 208b is greater than the minimum number of PSUs 206 for the unthrottled operation of the data center 202 (at 361), ultimately, a power capacity of the data center 202 and the PSUs 206 associated with the grid 208b is adjusted. At step 368, a maximum current limit is applied to the data center and the PSUs 206 to maintain peak power less than the product of the extended power range of the PSUs 206 (PSUepr) and capacity of the PSUs 206 associated with the grid 208b minus 1 is greater than an upper bound threshold. In some examples, in response to determining that the number of PSUs 206 associated with the grid 208b is greater than the minimum number of PSUs 206 for the unthrottled operation of the data center 202 (at 361), ultimately, the maximum current state of the data center 202 is adjusted. The method 300 proceeds to step 370 to identify the grid 208b, and then at step 372, the sub-function update grid is called. That is, the PSU firmware update 210 is applied to each of the PSUs 206 associated with the grid 208b. In some examples, after adjusting the power capacity (at 366) and adjusting the maximum current state of the data center (at 368), the PSU firmware update 210 is applied to the PSUs 206 associated with the grid 208b. The method 300 proceeds to step 374, where the previous power cap state is restored. In other words, after applying the PSU firmware update 210 to the PSUs 206 associated with the grid 208b, the previous power capacity of the data center 202 is restored. At step 376, the previous maximum current state is restored. In other words, after applying the PSU firmware update 210 to the PSUs 206 associated with the grid 208b, the previous maximum current state of the data center 202 is restored.

In some examples, in response to determining that the capacity of the PSUs 206 associated with the grid 208b minus 1 is not greater than the lower bound threshold (at 362), at 378, the PSUs 206 are updated when the data center 202 is in state 5. In some examples, in response to determining that the product of the extended power range of the PSUs 206 (PSUepr) and capacity of the PSUs 206 associated with the grid 208b minus 1 is not greater than an upper bound threshold (at 364), at 378, the PSUs 206 are updated when the data center 202 is in state 5. In some examples, if it is determined that the number of active PSUs 206 associated with grid 208b is greater than the minimum number of PSUs 206 for unthrottled operation of the data center 202, the method 300 proceeds to step 370 to identify the grid 208b.

After step 376, the method 300 proceeds to step 380. At 380, it is determined if there are any further PSUs 206 to apply the PSU firmware update 210 to. In other words, after applying the PSU firmware update 210 to each of the PSUs 206 associated with the grid 208b, remaining PSUs 206 are identified to apply the PSU firmware update 210 to. If it is determined there are no further PSUs 206 to apply the PSU firmware update 210 to, the method 300 proceeds to step 311, and the firmware update of the PSUs 206 is ended. If it is determined there are further PSUs 206 to apply the PSU firmware update 210 to, at 382, a log is created that indicates that a partial PSU update is performed and update of the remaining PSUs 206 is not currently possible. In other words, in response to identifying the remaining PSUs 206 (at step 380), a log event is created identifying the remaining PSUs 206. The method 300 proceeds to step 384, where it is determined whether the data center 202, or the server computing devices 204, are in the stage 5 state. When the data center 202, or the server computing devices 204 are not in the stage 5 state, it is re-determined whether the same are in the stage 5 state until the same are in the stage 5 state. When the data center 202, or the server computing devices 204, are in the stage 5 state, at 386, all remaining PSUs 206 are updated. At 388, the data center 202 is powered up, and at 311, the firmware update of the PSUs 206 is ended.

Figure 4:
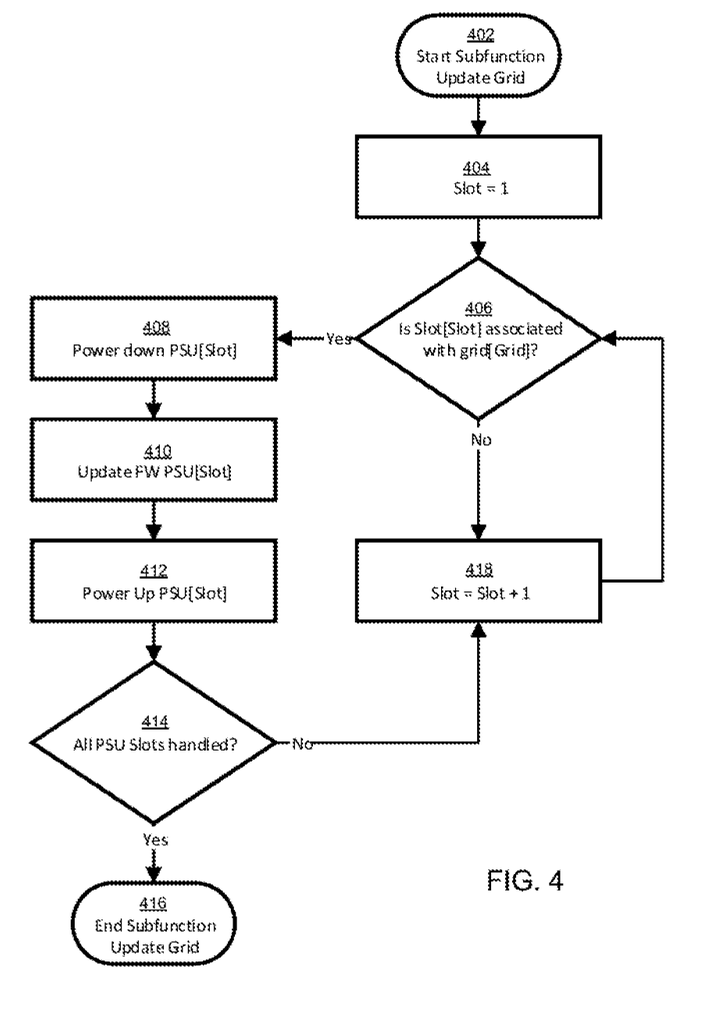

FIG. 4 illustrates a flowchart depicting selected elements of an embodiment of a method 400 for updating PSU firmware. The method 400 may be performed by the information handling system 100, the computing environment 200, and/or the update controller module 212 described herein with reference to FIGS. 1 and 2, or another information handling system. It is noted that certain operations described in method 400 may be optional or may be rearranged in different embodiments.

At 402, a sub-function update grid is called. At 404, a slot is set at 1. At 406, it is determined whether the slot number (e.g., 1) is associated with the grid (e.g., the grid 208a or grid 208b). If it is determined that the slot number is associated with the appropriate grid, at 408, the PSU 206 associated with the slot is powered down. At 410, the firmware update is applied to the PSU 206, and then the PSU 206 is powered up at 412. At 414, it is determined if all PSU slots are handled, and if yes, the method 400 proceeds to step 416, and the sub-function is ended. If not all PSU slots are handled, the slot number is increased at 418, and the method proceeds to step 406. At step 406, if it determined that the slot number is not associated with the appropriate grid, the method 400 proceeds to step 418.

Figure 5:
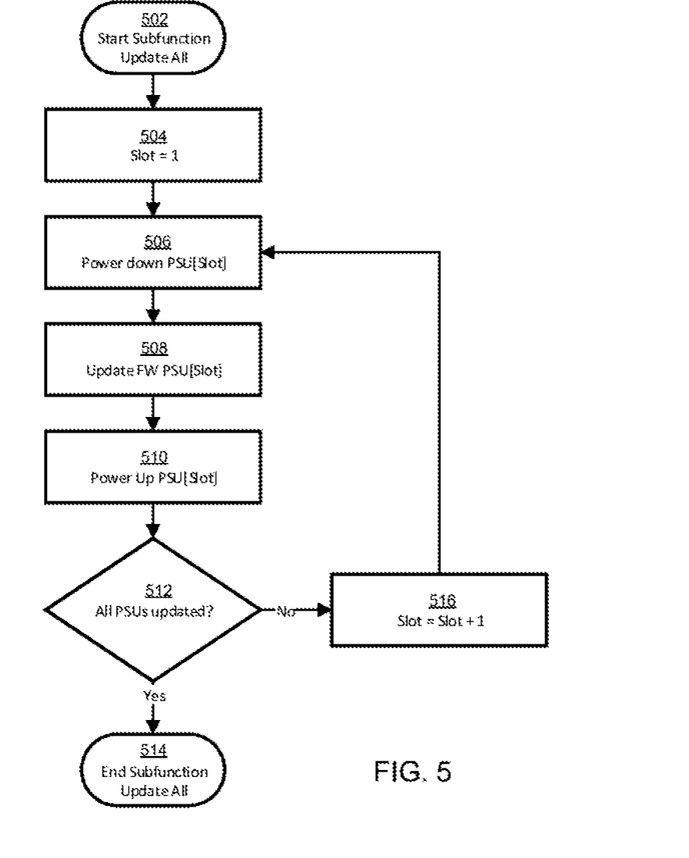

FIG. 5 illustrates a flowchart depicting selected elements of an embodiment of a method 400 for updating PSU firmware. The method 500 may be performed by the information handling system 100, the computing environment 200, and/or the update controller module 212 described herein with reference to FIGS. 1 and 2, or another information handling system. It is noted that certain operations described in method 400 may be optional or may be rearranged in different embodiments.

At 502, a sub-function update all is called. At 504, a slot is set at 1. At 506, the PSU 206 associated with the slot is powered down. At 508, the firmware update is applied to the PSU 206, and then the PSU 206 is powered up at 510. At 512, it is determined if all PSU slots are handled, and if yes, the method 500 proceeds to step 514, and the sub-function is ended. If not all PSU slots are handled, the method proceeds back to step 506.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method of updating power supply unit (PSU) firmware, the method comprising:
   determining that an update of the PSU firmware is received for a plurality of PSUs of a data center;
   determining that an update priority flag indicates unthrottled operation of the data center, and in response:
      determining that a number of PSUs of the data center is greater than a minimum number of PSUs for the unthrottled operation of the data center, and in response, applying the update to each of the PSUs of the data center;
      determining that the number of PSUs of the data center is less than the minimum number of PSUs for the unthrottled operation of the data center, and in response:
         adjusting a power capacity and maximum current state of the data center, and
         after adjusting the power capacity and the maximum current state of the data center, applying the update to each of the PSUs of the data center;
   determining that the update priority flag indicates redundancy of the data center, and in response:
      determining that a number of PSUs of the data center associated with a first electrical grid is greater than the minimum number of PSUs for the unthrottled operation of the data center, and in response, applying the update to each of the PSUs of the data center associated with the first electrical grid;
      determining that the number of PSUs of the data center associated with the first electrical grid is less than the minimum number of PSUs for the unthrottled operation of the data center, and in response:
         adjusting a power capacity and maximum current state of the data center, and
         after adjusting the power capacity and the maximum current state of the data center, applying the update to each of the PSUs associated with the first electrical grid of the data center.

2. The computer-implemented method of claim 1, further comprising:
   in response to determining that the update priority flag indicates redundancy of the data center:
   determining that a number of PSUs of the data center associated with a second electrical grid is greater than the minimum number of PSUs for the unthrottled operation of the data center, and in response, applying the update to each of the PSUs of the data center associated with the second electrical grid;
   determining that the number of PSUs of the data center associated with the second electrical grid is less than the minimum number of PSUs for the unthrottled operation of the data center, and in response:
      adjusting the power capacity and the maximum current state of the data center, and
      after adjusting the power capacity and the maximum current state of the data center, applying the update to each of the PSUs associated with the second electrical grid of the data center.

3. The computer-implemented method of claim 2, further comprising:
   after applying the update to each of the PSUs associated with the second electrical grid of the data center, identifying one or more remaining PSUs to apply the update to; and
   in response to identifying the remaining PSUs, creating a log event identifying the remaining PSUs.

4. The computer-implemented method of claim 1, further comprising:
   in response to determining that the update of the PSU firmware is received, determining that a live update indicator flag is set; and
   in response to determining that the live update indicator flag is set, determining a status of the update priority flag.

5. The computer-implemented method of claim 1, further comprising:
   in response to determining that the update of the PSU firmware is received, determining that a live update indicator flag is not set; and
   in response to determining that the live update indicator flag is not set, determining that the data center is in a sleeping state, and subsequently applying the update to each of the PSUs of the data center.

6. The computer-implemented method of claim 1, further comprising:
   after determining that the number of PSUs of the data center is less than the minimum number of PSUs for the unthrottled operation of the data center, determining that a capacity of the number of PSUs of the data center minus 1 is less than a lower bound threshold; and
   in response to determining that the capacity of the number of PSUs of the data center minus 1 is less than the lower bound threshold, creating a log event.

7. The computer-implemented method of claim 1, after applying the update to each of the PSUs of the data center, restoring the previous power capacity and maximum current state of the data center.

8. The computer-implemented method of claim 1, after applying the update to each of the PSUs associated with the first electrical grid of the data center, restoring the previous power capacity and maximum current state of the data center.

9. An information handling system comprising a processor having access to memory media storing instructions executable by the processor to perform operations comprising:
   determining that an update of PSU firmware is received for a plurality of PSUs of a data center;
   determining that an update priority flag indicates unthrottled operation of the data center, and in response:
      determining that a number of PSUs of the data center is greater than a minimum number of PSUs for the unthrottled operation of the data center, and in response, applying the update to each of the PSUs of the data center;
      determining that the number of PSUs of the data center is less than the minimum number of PSUs for the unthrottled operation of the data center, and in response:
         adjusting a power capacity and maximum current state of the data center, and
         after adjusting the power capacity and the maximum current state of the data center, applying the update to each of the PSUs of the data center;

determining that the update priority flag indicates redundancy of the data center, and in response:
  determining that a number of PSUs of the data center associated with a first electrical grid is greater than the minimum number of PSUs for the unthrottled operation of the data center, and in response, applying the update to each of the PSUs of the data center associated with the first electrical grid;
  determining that the number of PSUs of the data center associated with the first electrical grid is less than the minimum number of PSUs for the unthrottled operation of the data center, and in response:
    adjusting a power capacity and maximum current state of the data center, and
    after adjusting the power capacity and the maximum current state of the data center, applying the update to each of the PSUs associated with the first electrical grid of the data center.

10. The information handling system of claim 9, the operations further comprising:
  in response to determining that the update priority flag indicates redundancy of the data center:
    determining that a number of PSUs of the data center associated with a second electrical grid is greater than the minimum number of PSUs for the unthrottled operation of the data center, and in response, applying the update to each of the PSUs of the data center associated with the second electrical grid;
    determining that the number of PSUs of the data center associated with the second electrical grid is less than the minimum number of PSUs for the unthrottled operation of the data center, and in response:
      adjusting the power capacity and the maximum current state of the data center, and
      after adjusting the power capacity and the maximum current state of the data center, applying the update to each of the PSUs associated with the second electrical grid of the data center.

11. The information handling system of claim 10, the operations further comprising:
  after applying the update to each of the PSUs associated with the second electrical grid of the data center, identifying one or more remaining PSUs to apply the update to; and
  in response to identifying the remaining PSUs, creating a log event identifying the remaining PSUs.

12. The information handling system of claim 9, the operations further comprising:
  in response to determining that the update of the PSU firmware is received, determining that a live update indicator flag is set; and
  in response to determining that the live update indicator flag is set, determining a status of the update priority flag.

13. The information handling system of claim 9, the operations further comprising:
  in response to determining that the update of the PSU firmware is received, determining that a live update indicator flag is not set; and
  in response to determining that the live update indicator flag is not set, determining that the data center is in a sleeping state, and subsequently applying the update to each of the PSUs of the data center.

14. The information handling system of claim 9, the operations further comprising:
  after determining that the number of PSUs of the data center is less than the minimum number of PSUs for the unthrottled operation of the data center, determining that a capacity of the number of PSUs of the data center minus 1 is less than a lower bound threshold; and
  in response to determining that the capacity of the number of PSUs of the data center minus 1 is less than the lower bound threshold, creating a log event.

15. The information handling system of claim 9, the operations further comprising after applying the update to each of the PSUs of the data center, restoring the previous power capacity and maximum current state of the data center.

16. The information handling system of claim 9, the operations further comprising after applying the update to each of the PSUs associated with the first electrical grid of the data center, restoring the previous power capacity and maximum current state of the data center.

17. A non-transitory computer-readable medium storing software comprising instructions executable by one or more computers which, upon such execution, cause the one or more computers to perform operations comprising:
  determining that an update of the PSU firmware is received for a plurality of PSUs of a data center;
  determining that an update priority flag indicates unthrottled operation of the data center, and in response:
    determining that a number of PSUs of the data center is greater than a minimum number of PSUs for the unthrottled operation of the data center, and in response, applying the update to each of the PSUs of the data center;
    determining that the number of PSUs of the data center is less than the minimum number of PSUs for the unthrottled operation of the data center, and in response:
      adjusting a power capacity and maximum current state of the data center, and
      after adjusting the power capacity and the maximum current state of the data center, applying the update to each of the PSUs of the data center;
  determining that the update priority flag indicates redundancy of the data center, and in response:
    determining that a number of PSUs of the data center associated with a first electrical grid is greater than the minimum number of PSUs for the unthrottled operation of the data center, and in response, applying the update to each of the PSUs of the data center associated with the first electrical grid;
    determining that the number of PSUs of the data center associated with the first electrical grid is less than the minimum number of PSUs for the unthrottled operation of the data center, and in response:
      adjusting a power capacity and maximum current state of the data center, and
      after adjusting the power capacity and the maximum current state of the data center, applying the update to each of the PSUs associated with the first electrical grid of the data center.

18. The computer-readable medium of claim 17, the operations further comprising:
  in response to determining that the update priority flag indicates redundancy of the data center:
    determining that a number of PSUs of the data center associated with a second electrical grid is greater than the minimum number of PSUs for the unthrottled operation of the data center, and in response, applying the update to each of the PSUs of the data center associated with the second electrical grid;

determining that the number of PSUs of the data center associated with the second electrical grid is less than the minimum number of PSUs for the unthrottled operation of the data center, and in response:
  adjusting the power capacity and the maximum current state of the data center, and
  after adjusting the power capacity and the maximum current state of the data center, applying the update to each of the PSUs associated with the second electrical grid of the data center.

19. The computer-readable medium of claim 18, the operations further comprising:
  after applying the update to each of the PSUs associated with the second electrical grid of the data center, identifying one or more remaining PSUs to apply the update to; and
  in response to identifying the remaining PSUs, creating a log event identifying the remaining PSUs.

20. The computer-readable medium of claim 17, the operations further comprising:
  in response to determining that the update of the PSU firmware is received, determining that a live update indicator flag is set; and
  in response to determining that the live update indicator flag is set, determining a status of the update priority flag.

* * * * *